United States Patent
Cho et al.

(10) Patent No.: US 8,760,605 B2
(45) Date of Patent: Jun. 24, 2014

(54) DISPLAY DEVICE AND THE METHOD THEREOF

(71) Applicant: Samsung Display Co., Ltd., Yongin (KR)

(72) Inventors: Hyun Min Cho, Hwaseong-si (KR); Kwang Keun Lee, Osan-si (KR); Jae Byung Park, Seoul (KR)

(73) Assignee: Samsung Display Co., Ltd. (KR)

( * ) Notice: Subject to any disclaimer, the term of this patent is extended or adjusted under 35 U.S.C. 154(b) by 37 days.

(21) Appl. No.: 13/676,716

(22) Filed: Nov. 14, 2012

(65) Prior Publication Data

US 2014/0009723 A1  Jan. 9, 2014

(30) Foreign Application Priority Data

Jul. 3, 2012 (KR) .................. 10-2012-0072163

(51) Int. Cl.
  *G02F 1/1335*  (2006.01)
(52) U.S. Cl.
  USPC ........... 349/106; 349/107; 349/108; 349/113; 349/114
(58) Field of Classification Search
  USPC ................................. 349/106–108, 113–114
  See application file for complete search history.

(56) References Cited

U.S. PATENT DOCUMENTS

| | | |
|---|---|---|
| 6,295,106 B1 | 9/2001 | Fukuzawa et al. |
| 6,563,556 B2 | 5/2003 | Nikol et al. |
| 7,750,984 B2 | 7/2010 | Ha et al. |
| 2004/0105046 A1 | 6/2004 | Taira et al. |
| 2006/0238671 A1 | 10/2006 | Kim et al. |
| 2008/0158480 A1 | 7/2008 | Ii et al. |
| 2010/0265692 A1 | 10/2010 | Willemsen et al. |
| 2011/0013123 A1 | 1/2011 | Park et al. |
| 2011/0273864 A1 | 11/2011 | Izawa et al. |

FOREIGN PATENT DOCUMENTS

| | | |
|---|---|---|
| JP | 2007065361 A | 3/2007 |
| KR | 1020070046248 A | 5/2007 |
| KR | 1020090025590 A | 3/2009 |
| KR | 1020110049379 A | 5/2011 |
| KR | 1020110087051 A | 8/2011 |

OTHER PUBLICATIONS

Crossland, W.A., et al., "Photoluminescent liquid crystal displays and a new approach to large screen video applications," In Liquid Crystal Materials, Devices, and Flat Panel Displays, Ranganathan Shashidhar, Bruce Gnade, Editors, Proceedings of SPIE, vol. 3955, 2000, pp. 70-83.

Heo, G.J., et al., "Color PH-LCD Using STN Mode," Proc 5th Int Disp Workshops 1998, 1998, pp. 221-224.

(Continued)

*Primary Examiner* — Phu Vu
(74) *Attorney, Agent, or Firm* — Cantor Colburn LLP (57) ABSTRACT

A display device including: first, second and third substrates, where the second substrate is between the first and third substrates; a light amount controlling layer between the first and second substrates; a color providing layer between the second and third substrates; a light source unit which provides light; and a light guide plate disposed below the first substrate, where the light guide plate guides the light from the light source to the first substrate, where the light amount controlling layer and the color providing layer include pixels corresponding to each other, light from the light guide plate and passed through a pixel of the light amount controlling layer to pass through an adjacent pixel of the color providing layer, and the pixels of the color providing layer include a color conversion region and a transparent region.

20 Claims, 9 Drawing Sheets

(56) References Cited

OTHER PUBLICATIONS

Njo, Swie Lan, et al., "23.3: Light-Efficient Liquid Crystal Displays Using Photoluminescent Color Filters," SID Symposium Digest of Technical Papers, vol. 31, Issue 1, May 2000, pp. 343-345.

Travis, A., et al., "Collimated light from a waveguide for a display backlight," Optics Express, vol. 17, No. 22, Oct. 26, 2009, pp. 19714-19719.

Yata, Tatsuya, et al., "Improvement in luminescent properties of emissive LCD consisting of RGB patterned phosphors and near-UV LED," IDW '09, 2009, pp. 1009-1012.

DISPLAY DEVICE AND THE METHOD THEREOF

This application claims priority to Korean Patent Application No. 10-2012-0072163 filed on Jul. 3, 2012, and all the benefits accruing therefrom under 35 U.S.C. §119, the content of which in its entirety is herein incorporated by reference.

BACKGROUND (a) Field

Exemplary embodiments of the invention relate to a display device and a manufacturing method of the display device, and more particularly, to a display device with improved transparency thereof, in which color mixing and leakage of blue light are effectively prevented, and a manufacturing method thereof.

(b) Description of the Related Art

Display devices are widely used for various devices, such as a computer monitor, a television and a mobile phone, for example. The display devices include a cathode ray tube display device, a liquid crystal display, a plasma display device and the like.

A liquid crystal display, which is one of the most widely used types of flat panel displays, typically includes two panels with field generating electrodes such as a pixel electrode, a common electrode, and the like and a liquid crystal layer interposed between the two panels. The liquid crystal display generates an electric field in the liquid crystal layer by applying voltage to the field generating electrodes, and determines the direction of liquid crystal molecules of the liquid crystal layer by the generated electric field, thus controlling polarization of incident light to display images.

In a conventional display device, both a light amount controlling layer, which determines luminance by controlling a light amount passing through a substrate, and a color providing layer, which determines a color of emitting light, are typically provided. Recently, the color providing layer may include a phosphor or a quantum dot, and a display device, in which the light amount controlling layer and the color providing layer are separated from each other using three sheets of substrates, has been proposed. In such a display device, since a part of the light passing through the light amount controlling layer may not be vertically incident to a pixel of the color providing layer, the light may influence adjacent pixels, such that color mixing may occur. In addition, in the case where near-ultraviolet light or a blue wavelength light is used as a light source, blue light may be partially recognized in the front of a red pixel or a green pixel.

The display device includes a light guide plate to allow light emitted from the light source to be uniformly incident to the substrate, and a predetermined pattern is typically provided below the light guide plate such that a scattering of light may occur. Further, a plurality of optical sheets is provided between the light guide plate and the substrate such that a scattering of light may occur. In the case where the display device is a transparent display device, an object which is positioned at the rear surface of the display device may not be properly recognized due to the scattering of light.

SUMMARY

In exemplary embodiments of a display device and a manufacturing method of the display device, color mixing in a display device, in which a light amount controlling layer and a color providing layer are separated from each other, is effectively prevented.

In exemplary embodiments, where near-ultraviolet light or a blue wavelength is used as a light source, blue light is effectively prevented from being leaked in a red pixel or green pixel. In exemplary embodiments, where a display device is a transparent display device, a transparency thereof is substantially improved such that an object, which is positioned on the rear surface thereof, is substantially clearly shown therethrough without scattering.

An exemplary embodiment of the invention provides a display device including: a first substrate; a second substrate disposed on the first substrate; a third substrate disposed on the second substrate, where the second substrate is disposed between the first substrate and the third substrate; a light amount controlling layer disposed between the first substrate and the second substrate; a color providing layer disposed between the second substrate and the third substrate; a light source unit which provides light; and a light guide plate disposed below the first substrate, where the light guide plate guides the light from the light source to the first substrate, in which each of the light amount controlling layer and the color providing layer include a plurality of pixels, the pixels of the light amount controlling layer and the pixels of the color providing layer correspond to each other in a vertical direction, the light guide plate is configured to allow light passed through a first pixel of the pixels of the light amount controlling layer to pass through a second pixel of the color providing layer, which is adjacent to a first pixel of the pixels of the color providing layer corresponding to the first pixel of the light amount controlling layer, and each of the pixels of the color providing layer include a color conversion region, in which the light is converted and scattered, and a transparent region, in which the light is passing without conversion.

In an exemplary embodiment, the light guide plate may include a light incident portion, to which the light from the light source unit is incident, and an opposing portion, which is opposite to the light incident portion, and a thickness of the opposing portion may be greater than a thickness of the light incident portion.

In an exemplary embodiment, the light guide plate may further include a plurality of grooves formed in the opposing portion.

In an exemplary embodiment, a bottom surface of the light guide plate may connect the light incident portion and the opposing portion, and the bottom surface of the light guide plate may be substantially planar.

In an exemplary embodiment, the light source unit may provide near-ultraviolet light or blue light.

In an exemplary embodiment, the pixels of the color providing layer may include a red pixel, a green pixel and a blue pixel, a color conversion region of the red pixel may contain a red phosphor, a color conversion region of the green pixel may contain a green phosphor, and a color conversion region of the blue pixel may contain a scatterer.

In an exemplary embodiment, the pixels of the color providing layer may include a red pixel, a green pixel and a blue pixel, a color conversion region of the red pixel may contain a red quantum dot, a color conversion region of the green pixel may contain a green quantum dot, and a color conversion region of the blue pixel may contain a scatterer.

In an exemplary embodiment, the transparent region of the color providing layer may contain a scatterer.

In an exemplary embodiment, the color conversion region of a pixel of the color providing layer may be disposed in one of a left half side and a right half side of the pixel, and the transparent region of the pixel of the color providing layer may be disposed in the other of the left half side and the right half side of the pixel.

In an exemplary embodiment, the color conversion region of a pixel of the color providing layer may be disposed in a center portion of the pixel, and the transparent region of the pixel of the color providing layer may be positioned at a left side portion and a right side portion of the color conversion region of the pixel of the color providing layer, where the center portion may be disposed between the left side portion and the right side portion in the color conversion region.

In an exemplary embodiment, the color providing layer may further include partitions formed on boundaries of the pixels, and the partitions may include reflective materials.

In an exemplary embodiment, the light from the light source unit may pass through the light guide plate, the first substrate, the light amount controlling layer, the second substrate, the color providing layer and the third substrate in sequence, and an emitting angle of the light passed through the third substrate may be equal to or greater than about 70 degrees.

In an exemplary embodiment, the display device may be a transparent display device.

Another exemplary embodiment of the invention provides a manufacturing method of a display device, the manufacturing method including: preparing a first substrate, a second substrate and a third substrate; providing a light amount controlling layer between the first substrate and the second substrate; providing a color providing layer on the third substrate; disposing the third substrate on the second substrate such that the color providing layer is disposed between the second substrate and the third substrate; and providing a light guide plate below the first substrate and providing a light source unit at a side of the light guide plate, in which each of the light amount controlling layer and the color providing layer include a plurality of pixels, and the providing the color providing layer on the third substrate includes providing light blocking members on boundaries of the pixels of the color providing layer on the third substrate; providing color conversion regions in the pixels of the color providing layer; providing transparent regions in the pixels of the color providing layer; and providing partitions on the boundaries of the pixels of the color providing layer, and the light guide plate is configured to allow light passed through a first pixel of the pixels of the light amount controlling layer to pass through a second pixel of the color providing layer, which is adjacent to a first pixel of the pixels of the color providing layer corresponding to the first pixel of the light amount controlling layer.

In an exemplary embodiment, the light guide plate includes: a light incident portion to which the light from the light source unit may be incident; an opposing portion opposite to the light incident portion, where a bottom surface of the light guide plate connects the light incident portion and the opposing portion; and a plurality of grooves formed in the opposing portion, a thickness of the opposing portion may be greater than a thickness of the light incident portion, and the bottom surface of the light guide plate may be substantially planar.

In an exemplary embodiment, the light source unit provides near-ultraviolet light or blue light.

In an exemplary embodiment, the pixels of the color conversion regions may include a red pixel, a green pixel and a blue pixel, and the providing the color conversion regions in the pixels of the color conversion regions may include: providing a color conversion region of the red pixel using a resin containing scattered red phosphor in a predetermined region in the red pixel; providing a color conversion region of the green pixel using a resin containing scattered green phosphor in a predetermined region in the green pixel; and providing a color conversion region of the blue pixel using a resin containing scattered scatterers in a predetermined region in the blue pixel.

In an exemplary embodiment, the pixels of the color conversion regions may include a red pixel, a green pixel and a blue pixel, and the providing the color conversion regions in the pixels of the color conversion regions may include: providing a color conversion region of the red pixel using a resin containing scattered red quantum dots in a predetermined region in the red pixel; providing a color conversion region of the green pixel using a resin containing scattered green quantum dots in a predetermined region in the green pixel; and providing a color conversion region of the blue pixel using a resin containing scattered scatterers in a predetermined region in the blue pixel.

In an exemplary embodiment, the providing the transparent regions in the pixels of the color conversion regions may includes using a resin containing scattered scatterers.

In an exemplary embodiment, the light from the light source unit may pass through the light guide plate, the first substrate, the light amount controlling layer, the second substrate, the color providing layer and the third substrate in sequence, and the light guide plate may be configured to allow an emitting angle of the light passed through the third substrate to be greater than or equal to about 70 degrees.

According to one or more exemplary embodiments of the invention, color mixing is effectively prevented and transparency of a transparent display device is substantially improved by dividing a pixel of a color providing layer into a color conversion region and a transparent region.

According to one or more exemplary embodiments of the invention, light passed through a light amount controlling layer does not progress in a vertical direction to the light amount controlling layer, but the light passed through a pixel in the light amount controlling layer progresses to pass through adjacent pixels of the color providing layer, such that the light recognition in the front is effectively prevented by increasing an emitting light angle, and blue light is effectively prevented from being leaked in the front of a red pixel or green pixel.

According to one or more exemplary embodiments of the invention, where the display device is a transparent display device, a bottom surface of the light guide plate is substantially planar and an optical sheet is not used, such that transparency of the transparent display device is substantially improved.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION OF THE EMBODIMENTS

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of a display device according to the invention will be described with reference to the accompanying drawings.

Figure 1:
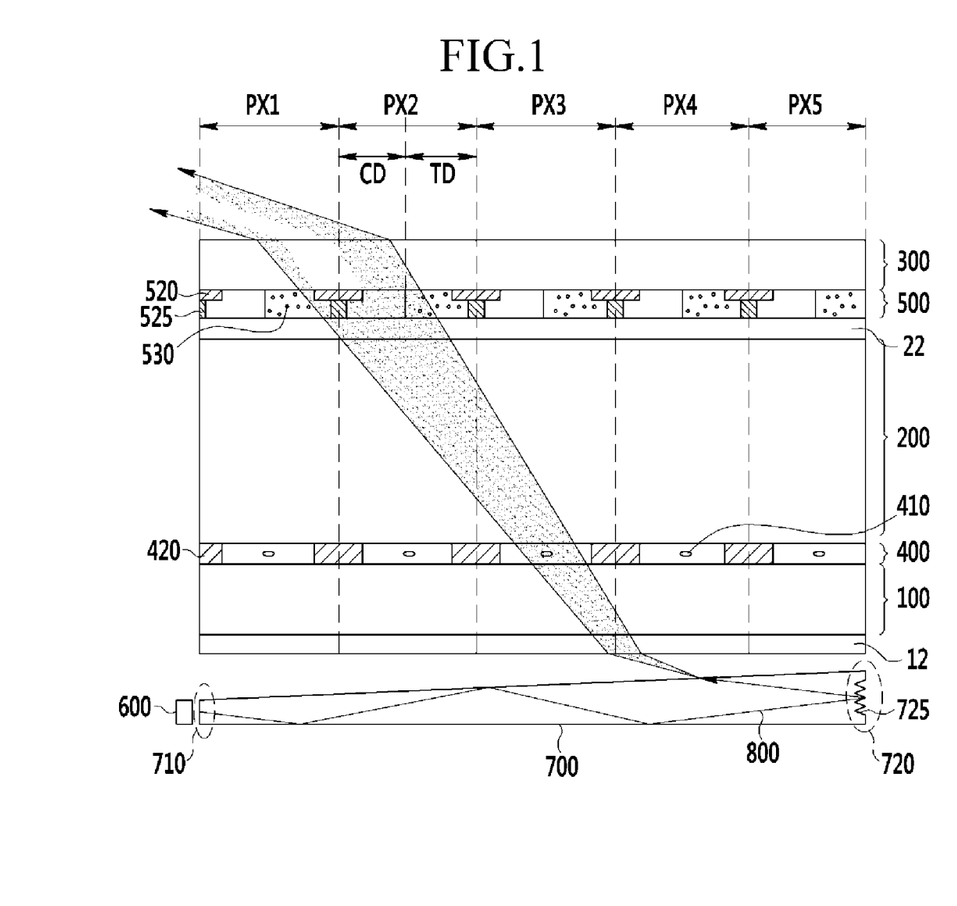
FIG. 1 is a cross-sectional view of an exemplary embodiment of a display device according to the invention.

FIG. 1 is a cross-sectional view of an exemplary embodiment of a display device according to the invention.

An exemplary embodiment of the display device according to the invention includes a first substrate 100, a second substrate 200 and a third substrate 300, which are laminated in sequence.

The first substrate 100, the second substrate 200 and the third substrate 300 may include a material such as transparent glass, plastic, or the like. In such an embodiment, a light amount controlling layer 400 is disposed between the first substrate 100 and the second substrate 200, and a color providing layer 500 is disposed between the second substrate 200 and the third substrate 300.

Each of the first substrate 100, the second substrate 200, the third substrate 300, the light amount controlling layer 400 and the color providing layer 500 include a plurality of pixels. The pixels of the first substrate 100, the second substrate 200, the third substrate 300, the light amount controlling layer 400 and the color providing layer 500 correspond to each other in a vertical direction. The pixels may be disposed on a plane substantially in a matrix form.

The light amount controlling layer 400 controls an amount of light transmitted from the first substrate 100 and transmits the light to the second substrate 200. Luminance of a screen displayed in the display device is determined based on the light amount that passes through the light amount controlling layer 400. In such an embodiment, the light amount controlling layer 400 serves to control luminance of each pixel.

In an exemplary embodiment, liquid crystal molecules 410 are disposed in the light amount controlling layer 400, and the amount of light that passes through the light amount controlling layer 400 may be controlled according to an alignment direction of the liquid crystal molecules 410.

Although not shown, in an exemplary embodiment, a gate line, a data line, a switching element connected to the gate line and the data line, and a pixel electrode connected to the switching element may be disposed on the first substrate 100. The switching element and the pixel electrode may be disposed in each pixel. In such an embodiment, a common electrode facing the pixel electrode may be disposed on the second substrate 200. A vertical electric field is generated between the pixel electrode and the common electrode such that directions of the liquid crystal molecules 410 are determined.

In an exemplary embodiment, a light blocking member 420 is provided on the first substrate 100 and/or the second substrate 200 and defines partition boundaries of a plurality of pixels.

A shape and a position of each electrode on the first substrate 100 and the second substrate 200 may be variously formed. In an exemplary embodiment, as described above, the pixel electrode is disposed on the first substrate 100 and the common electrode is disposed on the second substrate 200, but the invention is not limited thereto. In an alternative exemplary embodiment, both the pixel electrode and the common electrode may be formed on the first substrate 100, and in such an embodiment, as a horizontal electric field is generated between the pixel electrode and the common electrode, and the directions of the liquid crystal molecules 410 is thereby determined.

In an exemplary embodiment, a first polarizer 12 and a second polarizer 22 may be disposed on, e.g., adhere to, opposing surfaces of inner surfaces of the first substrate 100 and the second substrate 200 that face each other, e.g., outer surfaces of the first and second substrates 100 and 200. In such an embodiment, the first polarizer 12 may adhere to the outer side of the first substrate 100, and the second polarizer 22 may adhere to the outer side of the second substrate 200. A transmissive axis of the first polarizer 12 and a transmissive axis of the second polarizer 22 may be substantially perpendicular to each other.

The color providing layer 500 determines a color of the light transmitted from the second substrate 200 and transmits the light having the color to the third substrate 300. The pixels of the color providing layer 500 may include a first color pixel, a second color pixel and a third color pixel, for example. In one exemplary embodiment, for example, the first color pixel may be a red pixel, the second color pixel may be a green pixel, and the third color pixel may be a blue pixel. Light passing through the red pixel of the color providing layer 500 displays red, light passing through the green pixel displays green, and light passing through the blue pixel displays blue.

Each pixel of the color providing layer 500 may include a color conversion region CD which converts and scatters the color of the light and a transparent region TD which transmits the light without conversion, e.g., as it is. In an exemplary embodiment, as shown in FIG. 1, the color conversion region CD may be positioned on the left half side of the pixel and the transparent region TD may be positioned on the right half side of the pixel. In an alternative exemplary embodiment, the color conversion region CD may be positioned on the right half side of the pixel and the transparent region TD may be positioned on the left half side of the pixel.

The color conversion region CD of the color providing layer 500 may include a resin containing phosphor. The phosphor is a material that emits fluorescence by irradiating light, radiation, and the like, and light having a unique color of the phosphor is emitted regardless of a color of the irradiated light. Further, the light is emitted toward substantially all directions regardless of a direction of the irradiated light.

The red pixel of the color conversion region CD may include red phosphor. The light is incident to the red pixel of the color conversion region CD and irradiated to the red phosphor such that red light is scattered.

The green pixel of the color conversion region CD may include green phosphor. The light is incident to the green pixel of the color conversion region CD and irradiated to the green phosphor such that green light is scattered.

The blue pixel of the color conversion region CD may include blue phosphor. The light is incident to the blue pixel of the color conversion region CD and irradiated to the blue phosphor such that blue light is scattered.

In an exemplary embodiment, where light incident to the color providing layer 500 is near-ultraviolet light or blue light, the color conversion region CD of the blue pixel may include a scatterer instead of the blue phosphor. In such an embodiment, when the near-ultraviolet light or blue light is incident to the blue pixels of the color conversion region CD of the blue pixel and irradiated to the scatterer such that the blue light is scattered.

In an exemplary embodiment, as described above, the color conversion region CD includes the resin containing the phosphor, but the invention is not limited thereto. In an alternative exemplary embodiment, the color conversion region CD may include a resin containing a quantum dot. In such an embodiment, the red pixel of the color conversion region CD may contain a red quantum dot, the green pixel of the color conversion region CD may contain a green quantum dot, and the blue pixel of the color conversion region CD may contain a blue quantum dot. In such an embodiment, where the incident light is the near-ultraviolet light or blue light, the blue pixel of the color conversion region CD may contain a scatterer instead of the blue quantum dot.

The transparent region TD of the color providing layer 500 may include a resin containing a scatterer 530. The light from the second substrate 200 is directly incident to the transparent region TD and transmitted to the third substrate 300 without conversion, e.g., without changing the color of the light. In an exemplary embodiment, when the light, which is transmitted from the second substrate 200 and incident to the color conversion region CD, is irradiated to the phosphor and then scattered to the transparent region TD, the light of the converted color is emitted from the transparent region TD. The scatterer 530 may include titanium oxide ($TiO_2$).

The pixel includes the color conversion region CD and the transparent region TD, such that color mixing between adjacent pixels is effectively prevented. In one exemplary embodiment, for example, where the pixels includes a first pixel PX1, a second pixel PX2, a third pixel PX3, a fourth pixel PX4, and a fifth pixel PX5, as shown in FIG. 1, the first pixel PX1 and the fourth pixel PX4 may be red pixels, the second pixel PX2 and the fifth pixel PX5 may be green pixels, and the third pixel PX3 may be a blue pixel. In a conventional display device where the transparent region TD is not provided therein, a part of the incident light for displaying the second pixel PX2 may be incident to the adjacent first pixel PX1 such that the color mixing may occur. In an exemplary embodiment of the display device according to the invention, the transparent region TD of the first pixel PX1 is disposed between the color conversion region CD of the first pixel PX1 and the color conversion region CD of the second pixel PX2, such that the color mixing is effectively prevented.

In an exemplary embodiment of the display device according to the invention, of the display device may be a transparent display device. The transparent display device means a display device in which an object disposed at the rear surface of the display device may be recognized because a screen thereof is transparent. In such an embodiment, where the display device is the transparent display device, the transparent region TD is provided in each pixel, and transparency is thereby substantially improved.

Light blocking members 520 are disposed along the boundaries of the pixels of the color providing layer 500. In such an embodiment, partitions 525 may be disposed along the boundaries of the pixels of the color providing layer 500. The partition 525 may be disposed on the light blocking member 520, and a width of the partition 525 may be less than a width of the light blocking member 520.

An exemplary embodiment of the display device according to the invention may further include a light source unit 600 that provide light and a light guide plate 700 that guides light from the light source unit 600 to the first substrate 100.

In an exemplary embodiment, the light source unit 600 may be disposed below a side of the first substrate 100, but it is not limited thereto. In an alternative exemplary embodiment, the light source unit 600 may be disposed below both sides of the first substrate 100 and may be variously disposed. The light source unit 600 may include a light emitting diode ("LED") and the like, and the light emitted from the light source unit may be near-ultraviolet light or blue light. In an exemplary embodiment, a light emitting surface of the light source unit 600 is disposed to face one side of the light guide plate 700.

The light guide plate 700 may be disposed below the first substrate 100. The light guide plate 700 may include a light incident portion 710, to which light from the light source unit 600 is incident, and an opposing portion 720 facing the light incident portion 710. A thickness of the opposing portion 720 may be greater than a thickness of the light incident portion 710, and a plurality of grooves 725 may be provided in the opposing portion 720. The grooves 725 in the opposing portion 720 may have a V-like shape, and an angle of the light incident to the first substrate 100 may be controlled by an angle of the grooves 725.

The light guide plate 700 includes a bottom surface that connects the light incident portion 710 and the opposing portion 720, and the bottom surface of the light guide plate 700 is substantially planar. In such an embodiment, no pattern is formed on the bottom of the light guide plate 700, such that the light incident from the light source unit 600 is effectively prevented from being scattered at the bottom surface.

Hereinafter, a light path 800 which is incident from the light source unit 600 will be described. In an exemplary embodiment, the light incident to the light incident portion 710 of the light guide plate 700 is reflected to the groove 725 of the opposing portion 720 and incident to the first substrate 100. The light incident to the first substrate 100 is refracted at a predetermined angle according to Snell's law and then passes through the first substrate 100 to the light amount controlling layer 400, where the light amount is controlled. Thereafter, the light, amount of which is controlled, passes through the second substrate 200 and is incident to the color providing layer 500. When the light, which is incident to and passing through the color providing layer 500 without being scattered therein, passes through the third substrate 300, the light is refracted again at a predetermined angle according to Snell's law and emitted therefrom. In such an embodiment, the light guide plate 700 may be designed to allow an emitting angle of the light passed through the third substrate 300 to be greater than or equal to about 70 degrees. The light passed through the third substrate 300 forms an angle greater than or equal to about 70 degrees with respect to a front surface of the display device and thus is not recognized in the front. Accordingly, the color of the light emitted from the light source unit 600 is effectively prevented from being recognized in the front.

In an exemplary embodiment, as shown in FIG. 1 by a light path 800 of the light incident from the light source unit 600, the light passing through the third pixel PX3 of the light amount controlling layer 400 may pass through the second pixel PX2 of the color providing layer 500. When the light is incident substantially in a vertical direction to the first substrate 100, the light passed through the third pixel PX3 of the light amount controlling layer 400 is transmitted to the third pixel PX3 of the color providing layer 500. However, in an exemplary embodiment, where the light guide plate 700 is configured to allow the light to form a predetermined angle with the first substrate 100, the light passed through the third pixel PX3 of the light amount controlling layer 400 may pass through the second pixel PX2 of the color providing layer 500. In such an embodiment, the light passed through the second pixel PX2 of the light amount controlling layer 400 may pass through the first pixel PX1 of the color providing layer 500, and the light passed through the fourth pixel PX4 of the light amount controlling layer 400 may pass through the third pixel PX3 of the color providing layer 500.

In an exemplary embodiment, as described above, the light guide plate 700 is designed to allow the light passed through the third pixel PX3 of the light amount controlling layer 400 to pass through the second pixel PX2 of the color providing layer 500, but the invention is not limited thereto. In an alternative exemplary embodiment, the light guide plate 700 may be designed to allow the light passed through the third pixel PX3 of the light amount controlling layer 400 to pass through the fourth pixel PX4 of the color providing layer 500, or to allow the light passed through the third pixel PX3 of the light amount controlling layer 400 to pass through the first pixel PX1 of the color providing layer 500. In an exemplary embodiment, the light passed through a pixel of the light amount controlling layer 400 may pass through an adjacent pixel of the color providing layer 500 and may also pass another neighboring pixel, which is spaced apart from the pixel by at least one pixel therebetween when viewed from a top view.

An optical sheet (not shown) may be provided between the light guide plate 700 and the first substrate 100. In an exemplary embodiment of the display device according to the invention, the optical sheet is not provided between the light guide plate 700 and the first substrate 100. Accordingly, in such an embodiment, where the display device is a transparent display device, transparency is further improved by effectively preventing scattering of light due to the optical sheet, which may be used uniform distribution of light. In an exemplary embodiment of the display device according to the invention, the color providing layer 500 includes the phosphor or the quantum dot, such that distribution of the light is substantially uniform without using the optical sheet.

Hereinafter, alternative exemplary embodiments of a display device according to the invention will be described.

Figure 2:
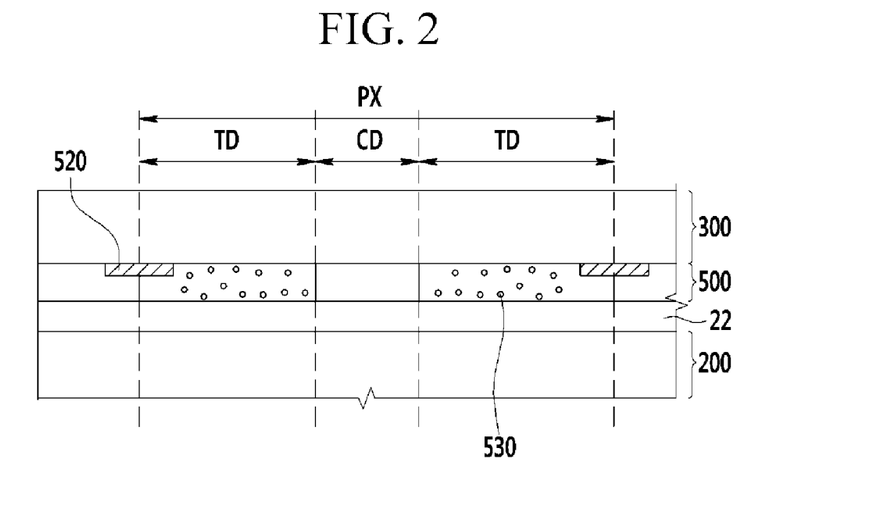
FIGS. 2 to 4 are cross-sectional view of alternative exemplary embodiments of a display device according to the invention.
Figure 3:
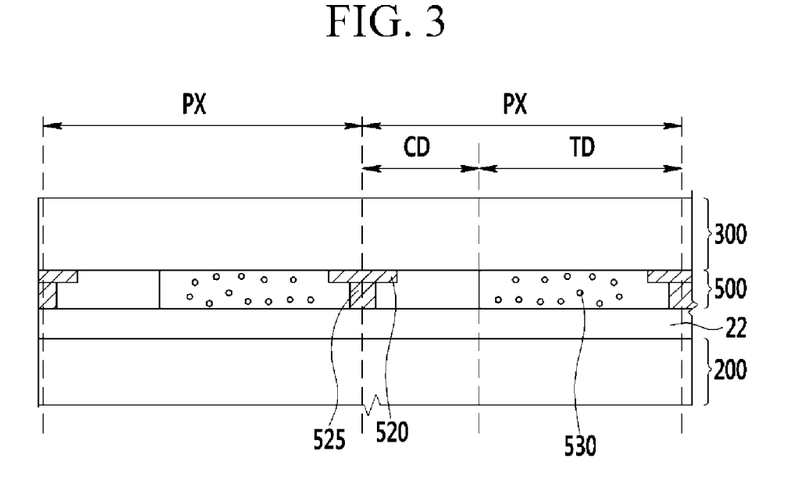
Figure 4:
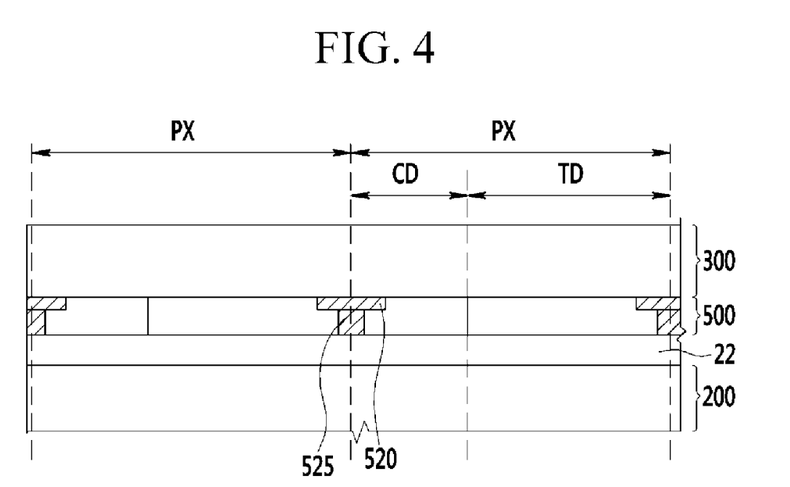

The alternative exemplary embodiments of the display device according to the invention is substantially the same as the exemplary embodiment of FIG. 1, except for a structure of the color providing layer, which it will now be described in greater detail. In an exemplary embodiment, the structure of the color providing layer may be variously modified, and hereinafter, various structures of the color providing layer will be described with reference to FIGS. 2 to 4. FIGS. 2 to 4 are cross-sectional view of alternative exemplary embodiments of a display device according to the invention.

The same or like elements shown in FIGS. 2 to 4 have been labeled with the same reference characters as used above to describe the exemplary embodiments of the display device shown in FIG. 1, and any repetitive detailed description thereof will hereinafter be omitted or simplified.

In an exemplary embodiment, referring to FIG. 2, the color providing layer 500 is disposed between the second substrate 200 and the third substrate 300. The color providing layer 500 includes a plurality of pixels PX, and one pixel PX thereof will be described.

Each pixel PX of the color providing layer 500 may include a color conversion region CD, which converts and scatters a color of light, and a transparent region TD, which transmits the light without conversion, e.g., as it is. In an exemplary embodiment, as shown in FIG. 2, the color conversion region CD is positioned on the center of the pixel PX, and the transparent region TD is positioned on the left side and the right side of the pixel PX. In such an embodiment, the transparent region TD is positioned at both sides of the color conversion region CD.

Light blocking members 520 are disposed along the boundaries of the pixels of the color providing layer 500. In an exemplary embodiment of the display device, as shown in FIG. 2, partitions are not provided on the boundaries of the plurality of pixels of the color providing layer 500, but not being limited thereto. In an alternative exemplary embodiment, the partitions may be provided, as shown in FIG. 1.

In another alternative exemplary embodiment, referring to FIG. 3, the color providing layer 500 disposed between the second substrate 200 and the third substrate 300 includes a plurality of pixels PX, and each pixel PX includes a color conversion region CD and a transparent region TD.

In the exemplary embodiment shown in FIGS. 1 and 2, areas of the color conversion region CD and the transparent region TD have substantially the same as each other. In such an embodiment, ratios of the areas of the color conversion region CD and the transparent region TD to an area of the pixel is substantially the same as each other. In the exemplary embodiment shown in FIG. 3, the area of the transparent region TD is greater than the area of the color conversion region CD.

In such an embodiment, as shown in FIG. 3, the light blocking members 520 and the partitions 525 are disposed on the boundaries of the plurality of pixels of the color providing layer 500

The partition 525 may be disposed on the light blocking member 520, and a width of the partition 525 may be less than a width of the light blocking member 520.

In an exemplary embodiment, the partitions 525 may include a reflective material. When the light incident to the color conversion region CD of the color providing layer 500 is reflected to the partitions 525, a probability that the light exists in the color conversion region CD is increased, thereby increasing an amount of light emitted therefrom. In such an embodiment, the light, which is scattered by the phosphor, the quantum dot, or the scatterer in the color conversion region CD of the color providing layer 500, is reflected to the partitions 525, such that the probability that the light exists in the color conversion region CD is increased, thereby increasing the amount of the light emitted therefrom.

In such an embodiment, where the area of the transparent region TD is greater than the area of the color conversion region CD, the amount of the light emitted from the color conversion region CD of the color providing layer 500 substantially increases, such that the color is effectively presented by the color conversion region CD having a relatively small area. In such an embodiment, that the transparency of the display device is further improved by the transparent region TD having a relatively large area.

In another alternative exemplary embodiment, referring to FIG. 4, the color providing layer 500 between the second substrate 200 and the third substrate 300 includes a plurality of pixels PX, and each pixel PX includes a color conversion region CD and a transparent region TD.

In the exemplary embodiment of the display device shown in FIGS. 1 to 3, the transparent region TD includes the resin containing scatterers 530, but in an alternative exemplary embodiment of the display device shown FIG. 4, the transparent region TD does not include the scatterers 530.

In an exemplary embodiment, as shown in FIG. 4, where the transparent region TD includes the resin without containing the scatterer, the light incident to the transparent region TD is not scattered, such that the transparency of the display device is further improved.

Hereinafter, an exemplary embodiment of a manufacturing method of the display device according to the invention will be described.

FIGS. 5 to 9 are cross-sectional views showing an exemplary embodiment of a manufacturing method of the display device according to the invention.

Figure 5:
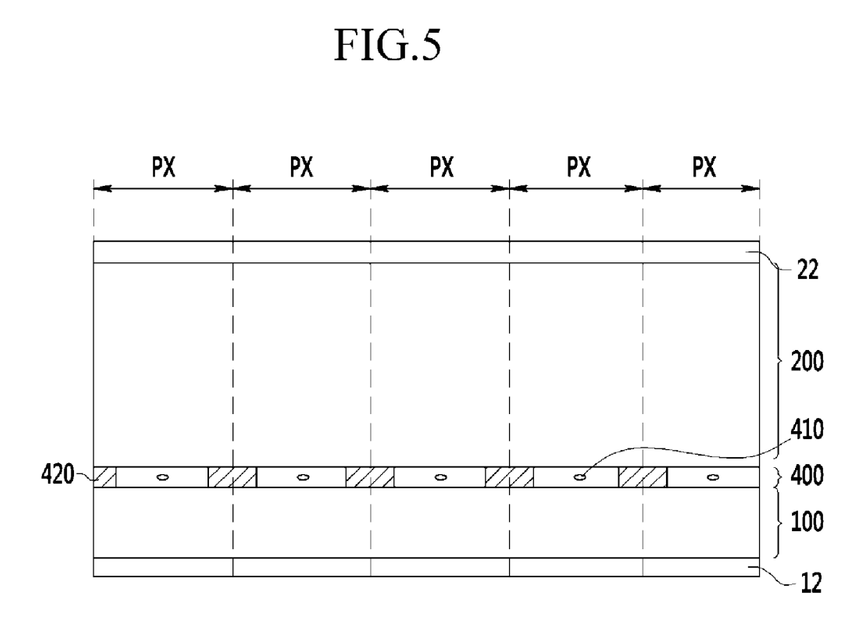
FIGS. 5 to 9 are cross-sectional views showing an exemplary embodiment of a manufacturing method of the display device according to the invention.

First, as shown in FIG. 5, the light amount controlling layer 400 is provided between the first substrate 100 and the second substrate 200. In one exemplary embodiment, for example, after a gate line, a data line, a switching element connected to the gate line and the data line, and a pixel electrode connected to the switching element are provided on the first substrate 100 and a common electrode is provided on the second substrate 200, the first substrate 100 and the second substrate 200 are disposed opposite to each other. In such an embodiment, the light amount controlling layer 400 may be provided by injecting the liquid crystal molecules 410 between the first substrate 100 and the second substrate 200.

Figure 6:
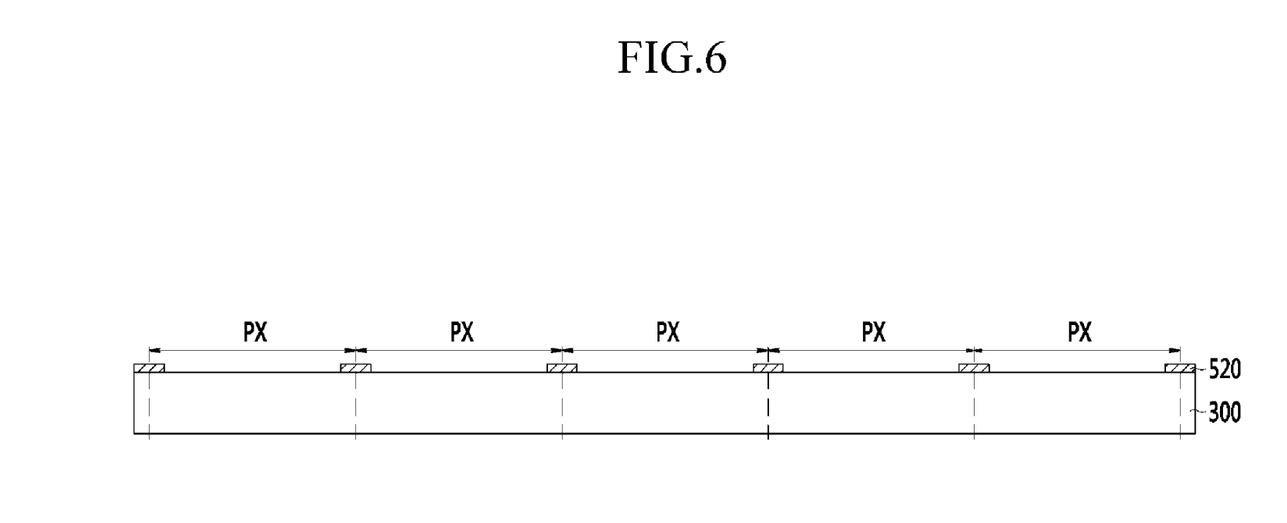

Next, as shown in FIG. 6, the light blocking member 520 is provided on the third substrate 300 based on the arrangement of the pixels PX in the display device. In such an embodiment, the light blocking member 520 may be provided along a boundary of the pixel PX.

Figure 7:
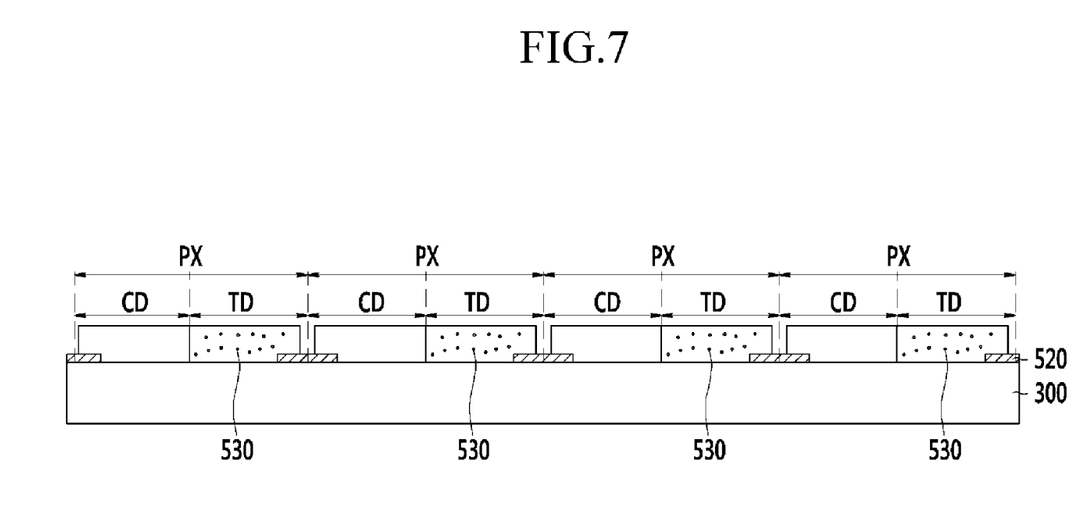

Next, as shown in FIG. 7, the color conversion region CD is provided using a resin, in which phosphor are scattered, in predetermined regions in each pixel PX on the third substrate 300. In an exemplary embodiment, the resin, in which phosphor are scattered, is coated on the third substrate 300 and patterned by a photolithography process to form the color conversion region CD. In an alternative exemplary embodiment, the color conversion region CD may be formed on the third substrate 300 by a printing process such as gravure offset printing, reverse offset printing and screen printing, for example.

The pixels PX may include a first color pixel, a second color pixel, a third color pixel and the like. In one exemplary embodiment, for example, the first color pixel may be formed as a red pixel, the second color pixel may be formed as a green pixel, and the third color pixel may be formed as a blue pixel. In such an embodiment, the forming of the color conversion region CD may include forming a color conversion region CD of the red pixel, forming a color conversion region CD of the green pixel, and forming a color conversion region CD of the blue pixel.

In an exemplary embodiment of the forming of the color conversion region CD of the red pixel, a resin having scattered red phosphor may be coated on the third substrate 300 and patterned thereafter.

In an exemplary embodiment of the forming of the color conversion region CD of the green pixel, a resin having scattered green phosphor may be coated on the third substrate 300 and patterned thereafter.

In an exemplary embodiment of the forming of the color conversion region CD of the blue pixel, a resin having scattered blue phosphor may be coated on the third substrate 300 and patterned thereafter. In an alternative exemplary embodiment of the forming of the color conversion region CD of the blue pixel, a resin having scattered scatterer may be coated on the third substrate 300 and patterned thereafter.

In an exemplary embodiment, as described above, the color conversion region CD is formed using the resin having the scattered phosphor, but the invention is not limited thereto. In an alternative exemplary embodiment, the color conversion region CD may be formed using a resin containing quantum dot instead of the phosphor.

In an alternative exemplary embodiment of the forming of the color conversion region CD of the red pixel, a resin having scattered red quantum dot may be coated on the third substrate 300 and patterned thereafter.

In an alternative exemplary embodiment of the forming of the color conversion region CD of the green pixel, a resin having scattered green quantum dot may be coated on the third substrate 300 and patterned thereafter.

In an alternative exemplary embodiment of the forming of the color conversion region CD of the blue pixel, a resin having scattered blue quantum dot may be coated on the third substrate 300 and patterned thereafter. In another alternative exemplary embodiment of the forming of the color conversion region CD of the blue pixel, a resin having scattered scatterer may be coated on the third substrate 300 and patterned thereafter.

After the color conversion region CD is provided in the predetermined regions in each pixel PX on the third substrate 300, the transparent region TD is provided in the remaining regions in each pixel PX on the third substrate 300. The transparent region TD may be formed using a resin containing the scatterer 530. The scatterer 530 may include titanium oxide TiO2.

Figure 8:
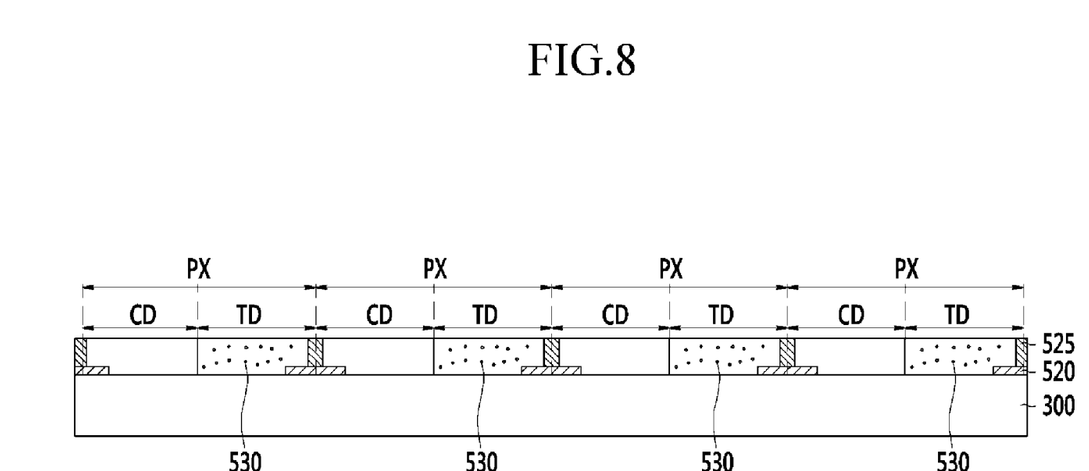

Next, as shown in FIG. 8, the partition 525 is provided on a boundary of each pixel PX. Two adjacent pixels are separated from each other by the partition 525.

The color providing layer 500 is provided on the third substrate 300 using the processes shown in FIGS. 6 to 8.

In manufacturing methods of the exemplary embodiments shown in FIGS. 1 to 4, a ratio of the areas of the color conversion region CD and the transparent region TD may be variously controlled, a material of the partition 525 may be variously selected, and the transparent region TD may be provided not to contain the scatterer.

In an exemplary embodiment, a planarization layer (not shown) may be further provided on the color providing layer 500. The planarization layer may be provided using a resin or a resin containing the scattered scatterer.

Figure 9:
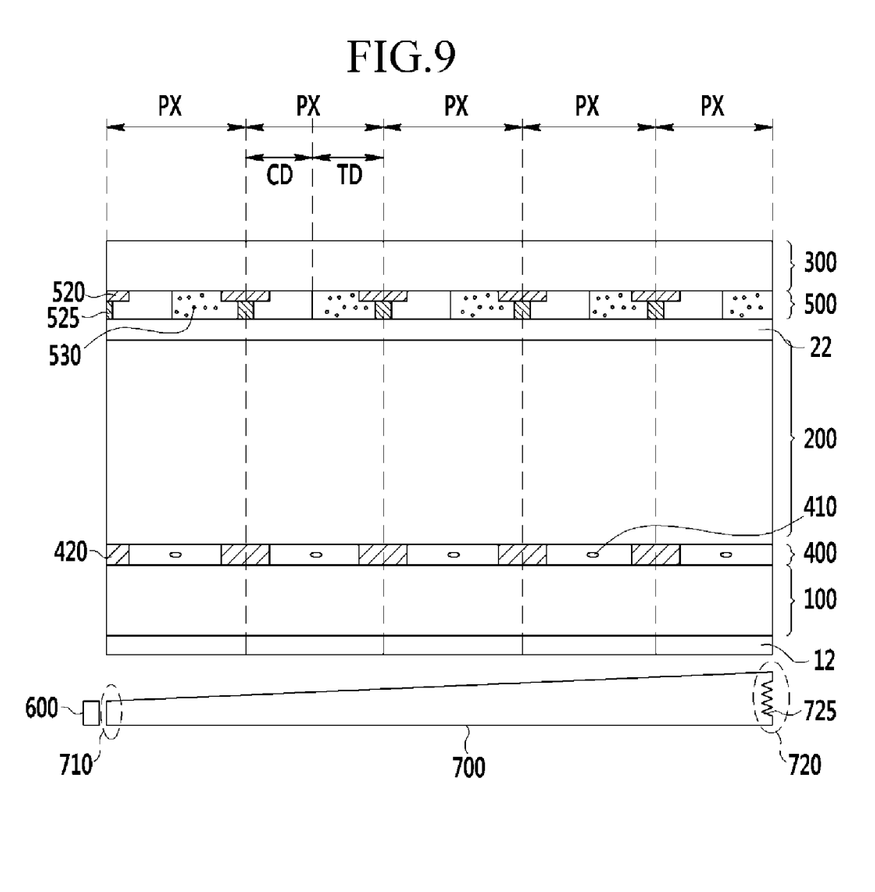

Next, as shown in FIG. 9, the third substrate 300 is provided on the second substrate 200, e.g., adheres to the second substrate 200, such that the color providing layer 500 is disposed between the second substrate 200 and the third substrate 300.

The light guide plate 700 is provided below the first substrate 100, and the light source unit 600 is provided at one side of the light guide plate 700. The light source unit 600 may supply near-ultraviolet light or blue light.

The one side of the light guide plate 700, where the light source unit 600 is disposed, corresponds to the light incident portion 710, and a side facing the light incident portion 710 corresponds to the opposing portion 720. A thickness of the opposing portion 720 of the light guide plate 700 is greater than a thickness of the light incident portion 710. A plurality of grooves 725 are formed in a V-like shape in the opposing portion 720, and an angle of the light incident to the first substrate 100 may be controlled by controlling an angle of the groove 725

The light guide plate 700 includes a bottom surface that connects the light incident portion 710 and the opposing portion 720, and the bottom surface of the light guide plate 700 is substantially planar. A pattern is not formed on the bottom of the light guide plate 700, such that the light incident from the light source unit 600 is effectively prevented from being scattered.

The light emitted from the light source unit 600 is incident to the first substrate 100 at an oblique angle by the groove 725 formed in the light guide plate 700, and an emitting angle out of the light emitted from the third substrate 300 is equal to or greater than about 70 degrees. The light passed through a pixel of the light amount controlling layer 400 may pass through an adjacent pixel of the color providing layer 500 or pass through a neighboring pixel, which is spaced apart from the pixel by at least one pixel therebetween when viewed from a top view.

In an exemplary embodiment, an optical sheet is not provided between the light guide plate 700 and the first substrate 100.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
    a first substrate;
    a second substrate disposed on the first substrate;
    a third substrate disposed on the second substrate, wherein the second substrate is disposed between the first substrate and the third substrate;
    a light amount controlling layer disposed between the first substrate and the second substrate;
    a color providing layer disposed between the second substrate and the third substrate;
    a light source unit which provides light to the first substrate; and
    a light guide plate disposed below the first substrate, wherein the light guide plate guides the light from the light source unit to the first substrate,
    wherein
    each of the light amount controlling layer and the color providing layer include a plurality of pixels,
    the pixels of the light amount controlling layer and the pixels of the color providing layer correspond to each other in a vertical direction,
    the light guide plate is configured to allow light passed through a first pixel of the pixels of the light amount controlling layer to pass through a second pixel of the color providing layer, which is adjacent to a first pixel of the pixels of the color providing layer corresponding to the first pixel of the light amount controlling layer, and
    each of the pixels of the color providing layer comprises:
        a color conversion region, in which the light is converted and scattered; and
        a transparent region, in which the light is passing without conversion.

2. The display device of claim 1, wherein
    the light guide plate comprises:
        a light incident portion, to which the light from the light source unit is incident; and
        an opposing portion, which is opposite to the light incident portion, and
    a thickness of the opposing portion is greater than a thickness of the light incident portion.

3. The display device of claim 2, wherein
    the light guide plate further comprises a plurality of grooves formed in the opposing portion.

4. The display device of claim 3, wherein
a bottom surface of the light guide plate connects the light incident portion and the opposing portion, and
the bottom surface of the light guide plate is substantially planar.

5. The display device of claim 1, wherein
the light source unit provides near-ultraviolet light or blue light.

6. The display device of claim 5, wherein
the pixels of the color providing layer comprises a red pixel, a green pixel and a blue pixel,
a color conversion region of the red pixel contains a red phosphor,
a color conversion region of the green pixel contains a green phosphor, and
a color conversion region of the blue pixel contains a scatterer.

7. The display device of claim 5, wherein
the pixels of the color providing layer comprises a red pixel, a green pixel and a blue pixel,
a color conversion region of the red pixel contains a red quantum dot,
a color conversion region of the green pixel contains a green quantum dot, and
a color conversion region of the blue pixel contains a scatterer.

8. The display device of claim 1, wherein
the transparent region of the color providing layer contains a scatterer.

9. The display device of claim 8, wherein
the color conversion region of a pixel of the color providing layer is disposed in one of a left half side and a right half side of the pixel, and
the transparent region of the pixel of the color providing layer is disposed in the other of the left half side and the right half side of the pixel.

10. The display device of claim 8, wherein
the color conversion region of a pixel of the color providing layer is disposed in a center portion of the pixel, and
the transparent region of the pixel of the color providing layer is positioned at a left side portion and a right side portion of the color conversion region of the pixel of the color providing layer,
wherein the center portion is disposed between the left side portion and the right side portion in the color conversion region.

11. The display device of claim 1, wherein
the color providing layer further comprises partitions disposed on boundaries of the pixels thereof, and
the partitions comprise a reflective material.

12. The display device of claim 1, wherein
the light from the light source unit passes through the light guide plate, the first substrate, the light amount controlling layer, the second substrate, the color providing layer and the third substrate in sequence, and
an emitting angle of the light passed through the third substrate is equal to or greater than about 70 degrees.

13. The display device of claim 1, wherein
the display device is a transparent display device.

14. A manufacturing method of a display device, the manufacturing method comprising:
preparing a first substrate, a second substrate and a third substrate;
providing a light amount controlling layer between the first substrate and the second substrate;
providing a color providing layer on the third substrate;
disposing the third substrate on the second substrate such that the color providing layer is disposed between the second substrate and the third substrate; and
providing a light guide plate below the first substrate, and providing a light source unit at a side of the light guide plate,
wherein each of the light amount controlling layer and the color providing layer comprises a plurality of pixels, and
wherein the providing the color providing layer on the third substrate comprises:
providing light blocking members on boundaries of the pixels of the color providing layer on the third substrate;
providing color conversion regions in the pixels of the color providing layer;
providing transparent regions in the pixels of the color providing layer; and
providing partitions on the boundaries of the pixels of the color providing layer, and
wherein the light guide plate is configured to allow light passed through a first pixel of the pixels of the light amount controlling layer to pass through a second pixel of the color providing layer, which is adjacent to a first pixel of the pixels of the color providing layer corresponding to the first pixel of the light amount controlling layer.

15. The manufacturing method of a display device of claim 14, wherein
the light guide plate comprises:
a light incident portion to which the light from the light source unit is incident;
an opposing portion opposite to the light incident portion, wherein a bottom surface of the light guide plate connects the light incident portion and the opposing portion; and
a plurality of grooves formed in the opposing portion,
a thickness of the opposing portion is greater than a thickness of the light incident portion, and
the bottom surface of the light guide plate is substantially planar.

16. The manufacturing method of a display device of claim 14, wherein
the light source unit provides near-ultraviolet light or blue light.

17. The manufacturing method of a display device of claim 16, wherein
the pixels of the color conversion regions comprises a red pixel, a green pixel and a blue pixel, and
the providing the color conversion regions in the pixels of the color conversion regions comprises:
providing a color conversion region of the red pixel using a resin containing scattered red phosphor in a predetermined region in the red pixel;
providing a color conversion region of the green pixel using a resin containing scattered green phosphor in a predetermined region in the green pixel; and
providing a color conversion region of the blue pixel using a resin containing scattered scatterers in a predetermined region in the blue pixel.

18. The manufacturing method of a display device of claim 16, wherein
the pixels of the color conversion regions comprises a red pixel, a green pixel and a blue pixel, and
the providing the color conversion regions in the pixels of the color conversion regions comprises:

providing a color conversion region of the red pixel using a resin containing scattered red quantum dots in a predetermined region in the red pixel;

providing a color conversion region of the green pixel using a resin containing scattered green quantum dots in a predetermined region in the green pixel; and providing a color conversion region of the blue pixel using a resin containing scattered scatterers in a predetermined region in the blue pixel.

19. The manufacturing method of a display device of claim 14, wherein the providing the transparent regions in the pixels of the color conversion regions comprises using a resin containing scattered scatterers.

20. The manufacturing method of a display device of claim 14, wherein the light from the light source unit passes through the light guide plate, the first substrate, the light amount controlling layer, the second substrate, the color providing layer and the third substrate in sequence, and the light guide plate is configured to allow an emitting angle of the light passed through the third substrate to be greater than or equal to about 70 degrees.

* * * * *